United States Patent [19]

Baumeister

[11] Patent Number: 4,717,974
[45] Date of Patent: Jan. 5, 1988

[54] WAVEGUIDE APPARATUS FOR COUPLING A HIGH DATA RATE SIGNAL TO AND FROM A ROTARY HEAD SCANNER

[75] Inventor: Hans P. Baumeister, Churchville, N.Y.

[73] Assignee: Eastman Kodak Company, Rochester, N.Y.

[21] Appl. No.: 864,375

[22] Filed: May 19, 1986

[51] Int. Cl.⁴ .............................................. G11B 15/14
[52] U.S. Cl. ..................................................... 360/64
[58] Field of Search ......................... 360/64, 61, 67, 68

[56] References Cited

U.S. PATENT DOCUMENTS 4,639,805  1/1987  Hirota et al. .......................... 360/64

Primary Examiner—Vincent P. Canney
Attorney, Agent, or Firm—Dennis P. Monteith

[57] ABSTRACT

Rotary scanner apparatus includes a headwheel having at least one magnetic head arranged for making successive operative sweeps across a magnetic tape. To achieve high data rate transfer, a unitary microwave transmission link includes a fixed cylindrical waveguide on a stationary side of the head scanner and a cooperating cylindrical waveguide rotatably mounted on the rotating side of the scanner. The waveguides are coaxially arranged along the rotational axis of the headwheel for directing a microwave signal, corresponding to a high data rate signal, to and from the headwheel during recording and playback operations. When the headwheel carries multiple magnetic heads, the unitary transmission link serves advantageously for the simultaneously coupling of a recording signal and a playback signal to and from the head scanner, for testing and certifying a recording system in real time.

7 Claims, 3 Drawing Figures

WAVEGUIDE APPARATUS FOR COUPLING A HIGH DATA RATE SIGNAL TO AND FROM A ROTARY HEAD SCANNER

CROSS-REFERENCE TO A RELATED APPLICATION

Reference is hereby made to U.S. patent application Ser. No. 819,668 entitled APPARATUS FOR CONTEMPORANEOUSLY COUPLING SIGNALS TO AND FROM A ROTARY HEAD SCANNER, by R. Raviv, filed on Jan 17, 1986.

BACKGROUND OF THE INVENTION

1. Technical Field of the Invention

The invention relates to recording and playback of signals from a magnetic tape. In particular, the invention relates to waveguide apparatus for coupling a high data rate signal to and from a rotary head scanner.

2. Description Relative To The Prior Art

A digital recording system must be capable of handling a very high data rate if a large volume of data is to be recorded in a relatively brief time interval. The need to enhance the data recording rate and packing density capability of a digital recorder of the rotary head scanner type places severe demands on existing methods for transferring the data signal to and from the magnetic head. Currently, the data signal to the rotary head is bandwidth limited by the commonly used rotary transformer to about 50 megahertz (50 MHz). The minimum bandwidth for a 300 megabit per second (Mb/sec) data rate, however, is 450 MHz, which, of course, is well beyond the frequency range of rotary transformers known in the art. Even with the introduction of electronics integral to a headwheel and improved transformer characteristics, rotary transformers known in the art. Even with the introduction of electronics integral to a headwheel and improved transformer characteristics, rotary transformers have a predicted upper bandwidth of only approximately 150 MHz. Accordingly, prior art digital recording apparatus suffers from a disadvantage in the inability to achieve the high data transfer rates required for currently proposed advanced digital recording systems.

Furthermore, it is desirable in the tape recording art to test and to certify that the tape recording system is accurately and reliably recording information. A high frequency, large volume recording system operating in real time requires a fast and efficient means of certification due to the cost involved in recording certain information, such as scientific data, which may not be repeatable. To date, playback, while simultaneously recording, has not been done satisfactorily with commercially available rotary head scanner apparatus.

U.S. Pat. No. 4,489,354 discloses rotary head scanner apparatus in which a stationary vertification head serves a monitoring function, checking continuously whether information to be recorded has actually been recorded. Although such a system has been found to work well for its intended purpose, it suffers from a disadvantage in that it fails to replicate the signals recorded, and thereby fails to provide information as to the quality of the recording.

In conventional rotary head scanner apparatus, the rotary transformer built into the scanner couples recording and playback signals to and from, respectively, rotating magnetic heads. A stationary part of a cylindrical assembly of the scanner contains the transformer primary; a rotating part of the assembly contains the transformer secondary. In recording, the stationary winding, as the primary, receives the signal, with magnetic coupling to the rotating secondary winding. In playback, the rotating winding acts as the primary coupling the signal into the stationary winding which acts as the secondary.

To simultaneously transfer multiple signals through a rotary transformer requires multiple coils on the rotating cores and multiple coils on the stationary cores. The distance between coils on the respective cores must be sufficient to avoid crosstalk between signals. Accordingly, in addition to the aforementioned bandwidth limitation of a rotary transformer, it is also difficult to simultaneously operate a rotary head scanner in both a record mode and a playback mode for a given size of rotary transformer.

It is known in the prior art that optical coupling of signals to and from a rotary head scanner offers potential advantages over a rotary transformer. Optical coupling permits broadband signal recording and reproduction with high efficiency and good signal-to-noise ratio; cross talk between multiple signals simultaneously transmitted can be virtually eliminated.

The aforementioned copending U.S. patent application Ser. No. 819,668, filed Jan 17, 1986 discloses rotary head scanner apparatus that is capable of bidirectional transfer of high fidelity signals contemporaneously. To that end, separate electro-optical data transmission channels serve, respectively, for routing a playback and a record signal between the stationary and rotating portions of the head scanner apparatus. Like rotary transformer apparatus for simultaneous bidirectional signal transmission, this arrangement also places restrictions on the size of the head scanner apparatus, because the uplink record channel and the downlink playback channel are required to be strategically placed at mutually exclusive points on the rotational axis of the headwheel.

SUMMARY OF THE INVENTION

In view of the foregoing, an object of the invention is to provide an even simpler arrangement for rotary head scanner apparatus for providing bidirectional transfer of a high data rate signal. This object is achieved with a unitary microwave signal transmission link for coupling a high data rate signal in both an uplink direction (a signal to be recorded) and in a downlink direction (a signal to be played back) along a central axis of rotation of a headwheel of the rotary scanner apparatus. The headwheel has at least one magnetic head arranged for making successive operative sweeps across a magnetic tape for effecting a magnetic transducer operation. In accordance with a presently preferred embodiment of the invention, the unitary microwave transmission link includes a fixed cylindrical waveguide operatively associated with a stationary portion of the head scanner appartus and a cooperating rotatable cylindrical waveguide operatively associated with a rotating portion of the scanner apparatus. The fixed waveguid and the rotatable waveguide are coaxally arranged along the rotational axis of the headwheel. At the downlink end of the microwave link, a first signal circulator, coupled to the fixed waveguide, serves (1) for routing a first microwave signal, corresponding to a signal to be recorded, to the fixed waveguide when the magnetic head is operated as a record head during a recording operation, and (2) to receive a second microwave signal, corresponding to a playback signal, from the fixed waveguide when the magnetic head is operated as a playback head during a playback operation. At the uplink end of the transmission link, a second signal circulator, coupled to the rotating waveguide, directs the first microwave signal to the record head during the recording operation, and routes the second microwave signal from the playback head to the rotating waveguide during a playback operation.

When the headwheel has at least one recording head and at least one playback head arranged for making alternating operative sweeps across the magnetic tape, the unitary microwave signal transmission link serves advantageously for coupling a recording signal and a playback signal to and from the headwheel at the same time, for certification testing of a recording operation in real time; furthermore, by means of a single microwave link for bidirectional data transmission link, apparatus of simple design and construction is provided for the coupling of uplink and downlink signals between the stationary and rotating portions of the head scanner apparatus.

The invention, and its other advantages, will become more apparent in the detailed description of a preferred embodiment presented below.

BRIEF DESCRIPTION OF THE DRAWINGS

In the detailed description of preferred embodiments of the invention presented below, reference is made to the accompanying drawings, in which.

DETAILED DESCRIPTION OF THE PREFERRED EMBODIMENTS

Figure 1:
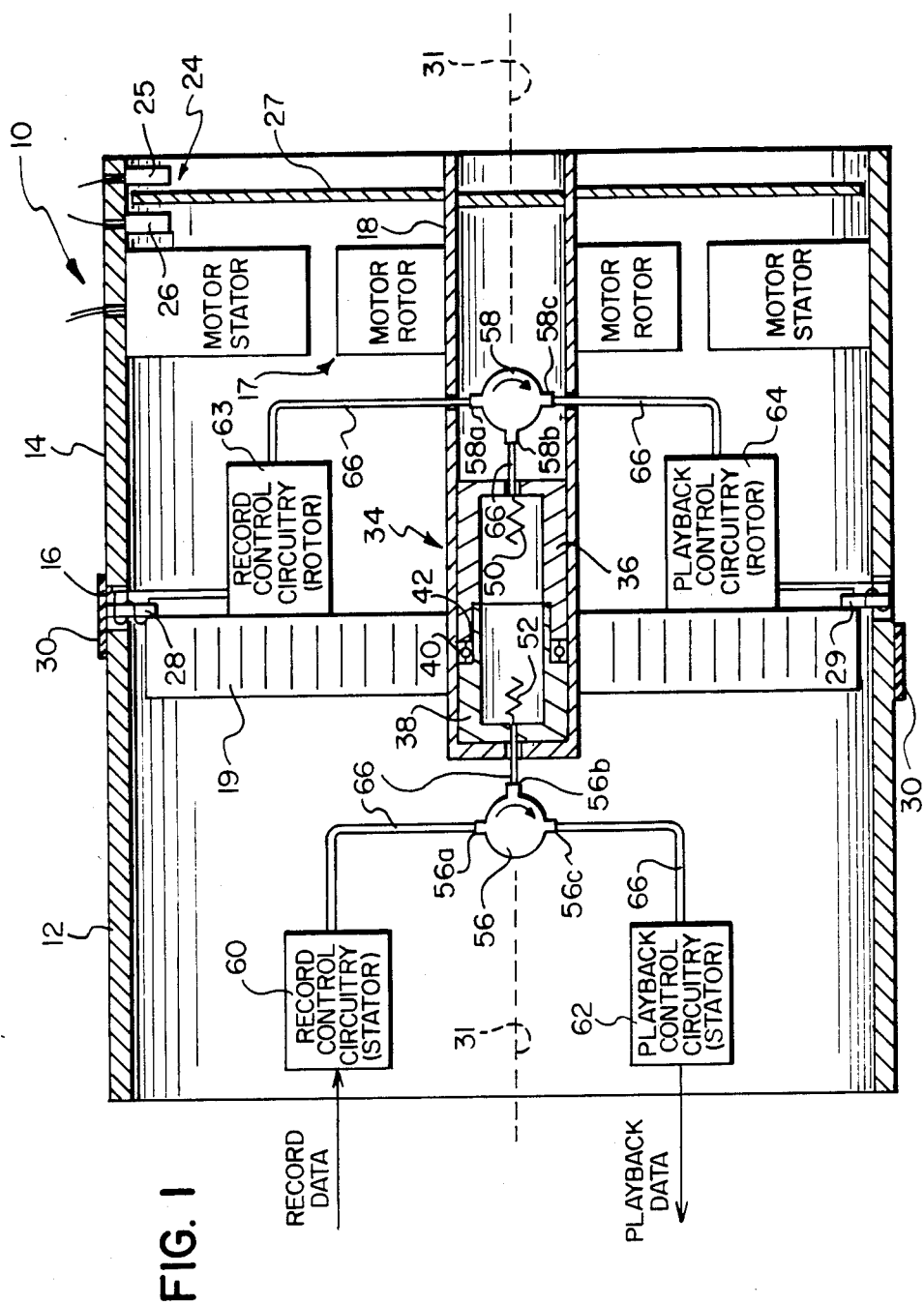
FIG. 1 is a cross-sectional view of rotary head scanner apparatus illustrating a unitary microwave transmission link, in accordance with the invention, for transferring a high data rate signal to and from a headwheel of the scanner.

FIG. 1 shows a rotary head scanner 10 of a type well known in the tape recording art having, generally, two coaxially arranged drum sections 12 and 14 separated to form a circumferential gap 16. A motor 17 drives a rotating element such as a hollow shaft 18, which carries a headwheel 19 mounted at the center of the drum sections for rotation in an operational plane in alignment with the gap 16.

A tachometer, denoted generally 24, serves to cause the motor 17 to drive the headwheel 19 at the appropriate speed. In particular, the so-called "once around" tachometer is suitable in this respect because it controls the phase and speed of the headwheel 19. For phase control, an LED 25 of the tachometer 24 causes a photodetector 26 to produce a timing pulse with each revolution of a slotted disk 27 coupled to the shaft 18. Each timing pulse can be compared with a reference signal for regulating the motor 17. Multiple timing marks on the disk 27 cause speed control of the headwheel 19 to be achieved in a manner well known in the art.

The headwheel 19 carries on its periphery two diametrically opposed magnetic heads 28 and 29 so that the tip of each head extends slightly beyond a plane common to the exterior surfaces of the two drum sections 12 and 14. When a magnetic tape 30 travels through a spiral path while partially wrapped about the drum sections 12 and 14, the headwheel 19 moves the tip of each of the magnetic heads across the tape in parallel tracks which are inclined with respect to a longitudinal edge of the tape 30; in this case, the headwheel 19 moves each magnetic head through approximately 270° in contact with the tape 30. It will be apparent to those skilled in the art, however, that additional magnetic heads may be provided on the headwheel 19, and that other angles are possible over which each head maintains contact with the tape.

In a preferred embodiment of the invention, the magnetic head 28, which serves as a record head, and the magnetic head 29, which operates for playback, are mounted on the same plane of the headwheel 19. With this arrangement, during a given revolution of the headwheel 19, the playback head 29 would actually sweep along a record track that was recorded by head 28 during a previous revolution of the headwheel; although playback is contemporaneous, and thus occurs simultaneously with recording, there would be a small lag between recording and playback of the same signal.

Other head mounting arrangements are within the scope of the invention, however, so that the magnetic head 29 plays back the signal that the head 28 records during the same revolution of the headwheel 19. For that purpose, the playback head 29 can be mounted at a level on the headwheel 19 that is different from the plane of the record head 28 so that both heads sweep across the same record track during each revolution of the scanner. Alternatively, the playback head 29 can be mounted immediately adjacent the record head 28, so that they effectively sweep across an identical area of the tape during the same revolution. In a further arrangement, the playback head 29 can have a track-wise width that is wide relative to the width of the record head 28. The width of the playback head 29 would permit a limited time lag and tape displacement, between the operative sweeps of the respective heads, while permitting immediate playback of the signal just recorded. In this case, the playback head would actually sweep across the record track just recorded and a guardband separating adjacent tracks.

An object of the invention is to provide head scanner apparatus of simple design and construction for recording and playing back a high data rate signal. For that purpose, the invention requires that a signal to be recorded and a signal to be played back are coupled to and form, respectively, the rotating headwheel along a unitary microwave signal transmission link. As used herein, "microwave" refers either to electromagnetic radiation or to an oscillating electrical signal, having a comparatively short wave wavelength on the order of between a fraction of a centimeter to approximately 100 centimeters. To that end, a microwave link, according to a presently preferred embodiment of the invention, includes, at one end, a fixed waveguide operatively associated with the stationary portion of the head scanner 10 and at the opposite end, a cooperating rotatable waveguide operatively associated with the rotating portion of the head scanner.

For the purpose of transferring microwave signals in either direction relative to the head scanner 10, the rotational axis 31 of the headwheel 19 serves as a stationary point through which signals can be coupled into and out of the microwave link. A microwave signal to be recorded—an uplink signal—and a microwave signal to be played back—a downlink signal—are applied, respectively, to the fixed waveguide and the rotatable waveguide which are aligned coaxially along the rotational axis 31.

FIG. 1 shows a unitary signal transmission link, in accordance with the invention, comprising a rotatable waveguide assembly 34 for directing uplink and downlink signals relative to the headwheel 19. For that purpose, the waveguide assembly 34 includes a rotatable cylindrical waveguide 36, on the uplink portion of the assembly, mounted for snychronous rotation with the shaft 18. A fixed cylindrical waveguide 38, forming the downlink portion of the assembly 34, is nested within the rotatable waveguide 36.

A rotary joint 40 having preferably a bearing assembly 42, serves for coupling the rotatable waveguide 36 and the fixed waveguide 38. For that purpose, the fixed waveguide 38 may be pressed or shrunk fit into the inner diameter of the bearing assembly 42. In doing so, the fixed waveguide 38 should penetrate into the rotary waveguide 40 on the order of a quarter of a wavelength at the operating frequency band, to insure good electrical continuity between the two waveguide sections and to suppress standing wave distrubances in the waveguide assembly 34 over the frequency band of interest. Although a simple bearing assembly is shown, it is clear that any desired type of bearing such as friction, thrust roller bearings or ball bearings could be used to facilitate the rotating of the waveguide 36 relative to the fixed waveguide 38.

A rotatable exciter 50 functions to couple signals into and out of the rotatable waveguide 36. For that purpose, the exciter 50 is circularly polarized for maximum and constant power transfer. The exciter 50 is aligned with the axis 31, and thus is stationary with respect to the rotational axis of the head scanner 10. Similarly, a fixed exciter 52, at the downlink end of the fixed waveguide 40, serves to couple signals into and out of the fixed waveguide 38. So that the wavefront of radiation is matched at the uplink and downlink ends of the waveguide assembly, the exciter 52 provides a circularly polarized wavefront to radiation propagating from the fixed waveguide into the rotatable waveguide 36.

A signal circulator 56 and a signal circulator 58, coupled, respectively, to the fixed and rotatable waveguides 38 and 36, serve to route their respective uplink and downlink signals to the appropriate output signal ports of the respective circulators. For uplink transmission, an input port 56a of the circulator 56 receives a signal, corresponding to a signal to be recorded, from record control circuitry 60, and applies that signal to port 56b. For downlink transmission, the port 56b receives a signal, corresponding to a signal being played back, from the waveguide assembly 34, and applies the playback signal to output port 56c, which is coupled to playback control circuitry 62.

Similarly, for uplink transmission, a port 58b of the circulator 58 receives the record signal, and applies that signal to record control circuitry 63 through a port 58a. Fory a downlink operation, an input port 58c receives the playback signal from playback control circuitry 64, and applies the playback signal to port 58b.

With the magnetic head 28 serving as a record head, the waveguide assembly 34 functions to propagate microwave radiation, corresponding to the signal to be recorded, to the headwheel 19. For that purpose, the record control circuitary 60, which includes a microwave signal generator, applies the record signal through a suitable signal transmission line 66 to the input port 56a of the circulator 56. The line 66 can be any suitable transmission link, such as a coaxial cable, stripline or microwave integrated circuit, suitable for handling a microwave signal.

The circulator 56 routes that signal to port 56b which is coupled to the exciter 52 through a line 66. The exciter 52 receives the output of the port 56b and directs radiation having a circularly polarized wavefront toward the uplink end of the waveguide assembly 34 for pick-up by the exciter 50. The port 58b, which coincides with the rotational axis 31 of the headwheel 19, and thus is a stationary point, receives the output of the exciter 50 through a line 66, and routes it to the record control circuitry 63, which is mounted on the headwheel 19. The magnetic head 28 receives the output of the circuitry 63 for recording the signal on the magnetic tape 30.

Similarly, when a magnetic head, such as head 29, functions as a playback head, the aforementioned recording operation is basically reversed. For a downlink operation, the waveguide assembly 34 serves for transmitting microwave radiation, corresponding to a playback signaln from the headwheel 19. For that purpose, circulator 58 receives the playback signal at port 58c from playback control circuitry 62 through a line 66, and routes the received signal to its port 58b. At the opposite end of the waveguide assembly 34, the port 56b of the circulator 56 receives the output of the exciter 52, and routes the received signal to playback control circuitry 62 for suitable processing of the playback signal.

When a recording operation and a playback operation are to occur contemporaneously, the uplink microwave signal and the downlink microwave signal are preferably modulated on different carrier frequencies to suppress intersignal interference and cross talk; thus, record and playback operations can occur simultaneously to test and to certify that the tape recording system is accurately and reliably recording data.

Figure 2:
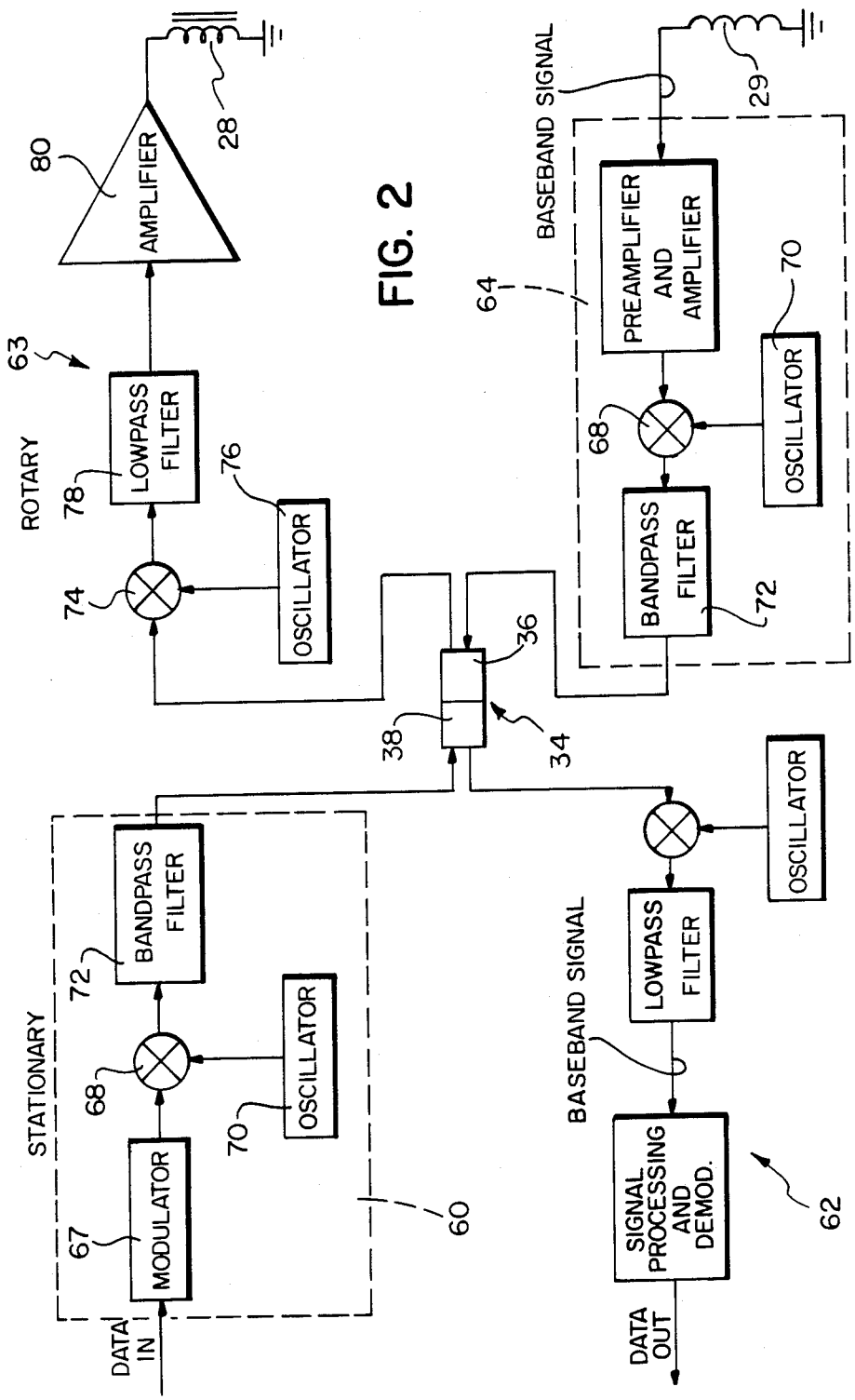
FIG. 2 is a block diagram of circuitry for transferring data to and from a rotary head scanner for recording and playback.

FIG. 2 shows an embodiment of signal processing circuitry for recording and playback operations. The aforementioned record control circuitry 60, located on the stationary side of the head scanner 10, serves for transmitting a signal to be recorded on a particular microwave carrier frequency. For that purpose, the circuitry 60 includes a modulator 67 which produces a microwave signal that is modulated by the signal to be recorded. Preferably, the microwave signal is frequency modulated (FM), although amplitude or phase modulation are suitable alternative signal processing techniques. For example, the output of the modulator 67 can be an FM carrier, fr, of approximately one gigahertz (GHz). For a baseband signal (a signal to be recorded) of a few hundred megabits (Mb) per second, useable sidebands of the carrier would be within a few hundred megahertz (MHz) of the carrier frequency.

A mixer 68 serves for providing a predetermined high frequency output for transmission through the aforementioned waveguide link. For that purpose, an oscillator 70 provides a microwave signal the frequency of which is offset from the frequency of the modulated carrier by a given amount. The mixer 68 receives the output of the oscillator 70 and combines it with the modulated carrier signal. As is known to those skilled in the art, the output of the mixer 68 is a composite signal, two primary components of which are modulated about separate frequencies equal respectively to the sum and the difference between the carrier and oscillator frequencies. Preferably, the oscillator output is on the order of eleven GHz, so that the output of the mixer 68 includes sum and difference signals modulated respectively about twelve and ten GHz. At that frequency, the oscillator 70 can be of the type known as a dialectrically stabilized oscillator which produces a very stable microwave signal.

A bandpass filter 72 receives the output of the mixer 68 and passes a signal in a band encompassing only one of the sidebands of the modulated carrier. For that purpose, the bandwidth of the filter 72 is on the order of a few hundred MHz, and preferably is centered at ten GHz.

The waveguide assembly 34 directs microwave radiation, corresponding to the output of the filter 72, from the stationary portion to the rotary portion of the head scanner 10. A mixer 74 receives the output of the waveguide assembly 34 and, in cooperation with an oscillator 76, produces a relatively low frequency signal, the bandwidth of which encompasses the sidebands of the modulated signal that is transmitted. For that purpose, the output of the oscillator 76 has a frequency between ten and eleven GHz.

A low pass filter 78 of the record control circuitry 63 provides a relatively smooth output corresponding to the output of the mixer 74. An amplifier 80 serves to amplify the output of the filter 78 to a level needed for saturation recording by the record head 28.

For the purpose of transmitting a playback signal from the headwheel 19 in a playback mode, the playback control circuitry 64 mounted on the rotary side of the head scanner 10, and the playback control circuitry 62 mounted on the statoinary side, provide a reverse sequence of signal processing operations for routing the downlink microwave signal for appropriate playback. FIG. 2 also shows the sequence of operations in playback, where like numerals identify elements that are structurally or functionally identical to or similar to elements of the signal processing recording operation. In the playback mode, however, the carrier for the downlink playback signal is at a frequency that is different from the carrier frequency of the uplink record signal, to reduce interference and crosstalk resulting from simultaneous record and playback operations. For that purpose, an oscillator 70, operative in playback, has an output for suitably controlling the sum and difference frequencies at the output of the mixer 68 for the playback control circuitry 64.

For simultaneously routing multichannel signals for recording and playback by two or more record and playback heads carried by the headwheel 19, multichannel signals can be multiplexed to transmit signals from all channels to and from the rotating headwheel along a single microwave transmission link, such as is shown in FIG. 1.

Figure 3:
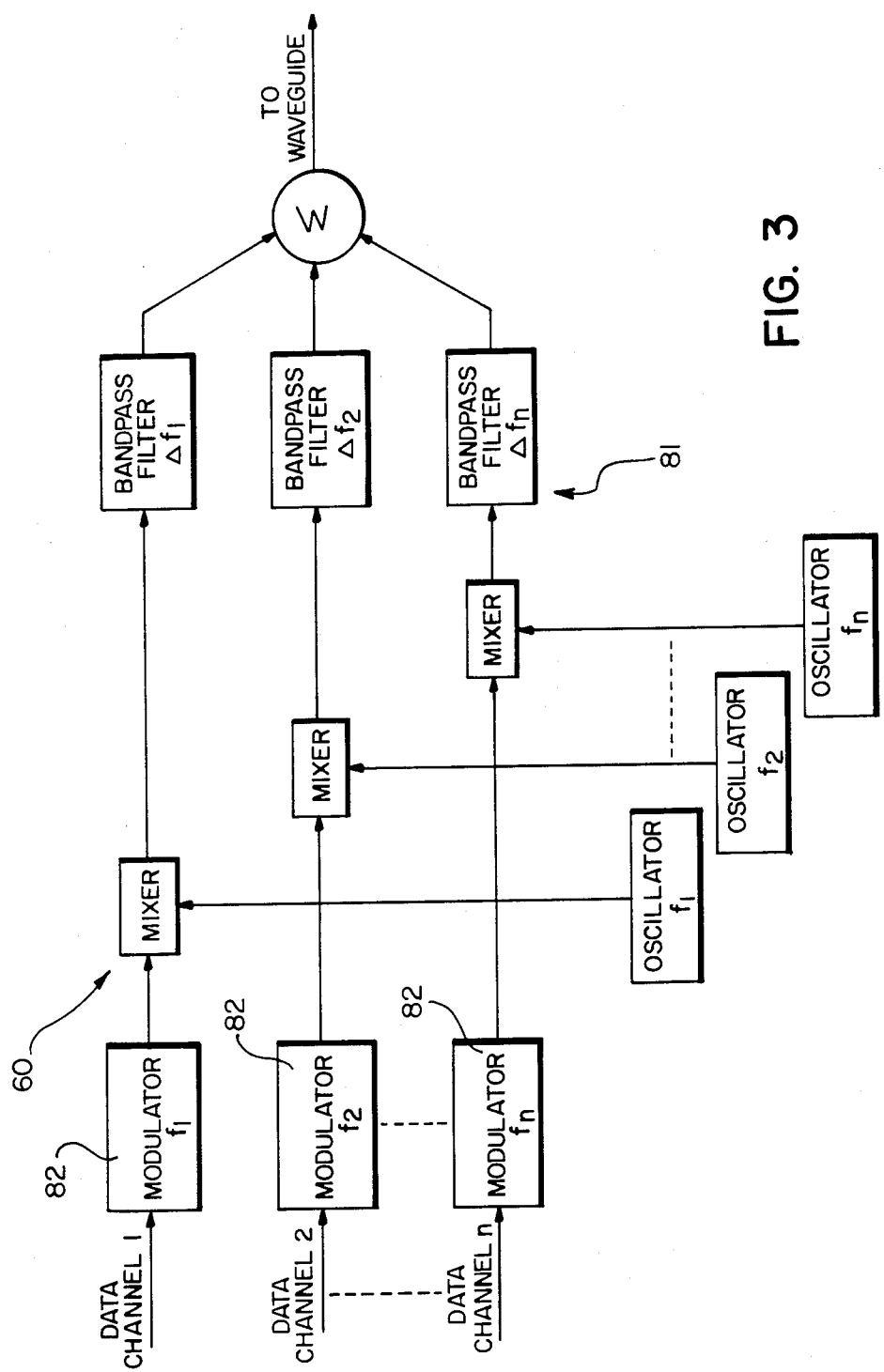
FIG. 3 is a block diagram for transferring multichannel data to the head scanner for recording.

FIG. 3 shows a block diagram of frequency division multiplexing apparatus 81 for use with the present invention. The record control circuitry 60 on the stationary side of the head scanner 10 serves for simultaneously transmitting signals from n separate data input channels to the headwheel 19, for recording by n separate record heads, where n is a positive integer greater than one. For that purpose, the control circuitry 60 includes a bank of modulators 82, each of which receives at its respective input a channel signal to be recorded. Like the modulator 67 of FIG. 2, the purpose of each of the modulators 82 is to transmit a record signal on a particular microwave carrier frequency. In the circuitry of FIG. 3, however, each of the channel signals modulates a separate subcarrier of frequency division multiplexing apparatus 81, wherein the subcarriers are spaced in frequency. By using different frequency bands for the transmission of each input signal, frequency division multiplexing permits the transmission of multiple signals over a common microwave transmission link using a single waveguide. It will of course be obvious to those skilled in the art that suitable frequency division demultiplexing circuitry is required on the rotating side of the head scanner 10 for separating the multiplexed signal into n separate FM modulated signals.

For the purpose of transmitting n multichannel playback signals from the headwheel 19 in a playback mode, the playback control circuitry 64 on the rotary side of the head scanner 10 provides for multiplexing the multiple playback signals; similarly, the playback control circuitry 62 on the stationary side provides for demultiplexing the playback signals. Otherwise, the sequence of signal processing operations for routing multiple playback signals to the appropriate playback channels is the reverse of the sequence of signal processing recording operations.

In a case where a multichannel signal exceeds the useful bandwidth of the waveguide assembly, separate bandpass signals can be routed to two or more coaxially arranged waveguides; multiple microwave output signals can be multiplexed and separated by using left and right hand circular polarization techniques.

Electronics mounted on the headwheel 19 can receive power from a generator (not shown) on the shaft 18. Alternatively, as is taught in U.S. Pat. No. 4,455,584, a rotary transformer or slip rings (also not shown) can conduct medium frequency AC power from the stationary to the rotary portion of the head scanner 10. Electronics mounted on the headwheel 19 would rectify this power. The motor 17 and the tachometer 24, on the other hand, can receive power directly from a power supply (not shown).

The high frequency signal processing circuitry—circuits for forming and processing the frequency modulated carrier and oscillator signal—can be combined into a single microwave monolithic integrated circuit, to further simplify the head scanner apparatus. An integrated circuit of this type using gallium arsenide technology has been previously proven in the marketplace by a variety of companies, both for military and consumer applications. The circuitry for handling the lower frequency signals—those frequencies associated with the lowpass sideband of the frequency modulated carrier—can be handled by conventional silicon-based technology of the type commonly used for commercially available consumer electronic products.

The coupling of signals to and from a rotary head scanner, according to the invention, has general application to high fidelity recording and playback of signals at frequencies up to several hundred megabits (Mb) per second. Furthermore, a unitary microwave transmission link, in accordance with the invention, serves advantageously for the simultaneous coupling of recording and playback signals to and from the head scanner. With this arrangement, testing and certification of the recording system can be accomplished in real time. Not only is such a high data rate not presently possible using a rotary transformer in a conventional rotary recording apparatus, but certification testing of individual channels can be accomplished simultaneously with recording. If a particular channel happens to be defective, whatever the reason, an operator can route a signal on the defective channel to an oeprative channel for recording.

The invention may be used with a digital recording system requiring a high data rate such as a laboratory recorder or a recorder used with a large scale computer system for the recording of a large volume of data in a brief interval.

The invention offers certain other advantages. For example, because signals are multiplexed and thereby transmitted to and from the headwheel over a single microwave link, the invention offers advantages from the standpoint of simplicity of design, low cost, etc. Microwave coupling also offers opportunity for the transfer of signals under a low noise condition, thereby enhancing signal-to-noise performance. The wide bandwidth offered by microwave coupling also provides for the opportunity of data transfer at variable speeds.

The invention has been disclosed in detail with reference to a preferred embodiment thereof, but it will be understood that variations and modifications can be effected within the spirit and scope of the invention.

What is claimed is:

1. In rotary scanner apparatus having a stationary portion, and a rotating portion including a headwheel having a central axis of rotation, said headwheel having at least one magnetic head arranged for making successive operative sweeps across a magnetic storage medium for effecting a magnetic transducer operation, the improvement comprising:
a unitary microwave transmission link including fixed waveguide means operatively associated with said stationary portion of said scanner apparatus and cooperating rotary waveguide means operatively associated with said rotating portion of said scanner apparatus, said fixed waveguide means and said rotating waveguide means being coaxially arranged along the rotational axis of said headwheel for directing (1) a microwave signal, corresponding to a signal to be recorded, from said stationary portion to said rotating portion of said scanner apparatus when said magnetic head is a record head, and (2) a microwave signal, corresponding to a playback signal, from said rotating portion to said stationary portion when said magnetic head is a playback head.

2. In rotary scanner apparatus having a stationary portion, and a rotating portion including a headwheel having a central axis of rotation, said headwheel having at least one magnetic head arranged for making successive operative sweeps across magnetic storage medium for effecting a magnetic transducer operation, the improvement comprising:
(a) a unitary bidirectional microwave transmission link including a fixed waveguide operatively associated with said stationary portion of said scanner apparatus and a cooperating rotary waveguide operatively associated with said rotating portion of said scanner apparatus, said fixed waveguide and said rotating waveguide being coaxially arranged along the rotational axis of said headwheel for respectively directing microwave signals in either direction along said microwave transmission link between said stationary portion of said scanner apparatus and said rotating portion of said scanner apparatus; and (b) a first signal circulator and a second signal circulator coupled respectively to said fixed waveguide and to said rotating waveguide;
(c) said first circulator being arranged to apply a first microwave signal, corresponding to a signal to be recorded, to said fixed waveguide when said magnetic head is operated as a record head during a recording operation, and to receive a second microwave signal, corresponding to a playback signal, from said fixed waveguide when said magnetic head is operated as a playback head during a playback operation;
(d) said second circulator being arranged to receive the first microwave signal from said rotating waveguide and to cause the latter signal to be applied to said record head during the recording operation, and further being arranged to receive the second microwave signal from said playback head and to apply the latter signal to said rotating waveguide during the playback operation.

3. In rotary scanner apparatus having a stationary portion, and a rotating portion including a headwheel having a central axis of rotation, said headwheel having at least one recording head and at least one playback head arranged for making alternating operative sweeps across a magnetic storage medium for recording and playback contemporaneously, the improvement comprising:
a unitary microwave transmission link including fixed waveguide means operatively associated with said stationary portion of said scanner apparatus and cooperating rotary waveguide means operatively associated with said rotating portion of said scanner apparatus, said fixed waveguide means and said rotating waveguide means being coaxially arranged along the rotational axis of said headwheel for contemporaneously directing in respectively opposing directions between said stationary portion and said rotating portion of said scanner apparatus (1) a first microwave signal, corresponding to a signal to be recorded, to a record head, and (2) a second microwave signal, corresponding to a playback signal, from a playback head, whereby the certification of the operation of said rotary scanner apparatus is accomplished during a recording operation by recording information while contemporaneously reading information.

4. In rotary scanner apparatus having a stationary portion, and a rotating portion including a headwheel having a central axis of rotation, said headwheel having at least one recording head and at least one playback head arranged for making alternating operative sweeps across a magnetic storage medium for recording and playback contemporaneously, the improvement comprising:
(a) a unitary bidirectional microwave transmission link including a fixed waveguide operatively associated with said stationary portion of said scanner apparatus and a cooperating rotary waveguide operatively associated with said rotating portion of said scanner apparatus, said fixed waveguide and said rotating waveguide being coaxially arranged along the rotational axis of said headwheel for respectively directing microwave signals in either direction contemporaneously along said microwave transmission link between said stationary portion of said scanner apparatus and said rotating portion of said scanner apparatus; and (b) a first signal circulator and a second signal circulator coupled respectively to said fixed waveguide and to said rotating waveguide;

(c) said first circulator being arranged to apply a first microwave signal, corresponding to a record signal, to said fixed waveguide during a recording operation, and to receive a second microwave signal, corresponding to a playback signal, from said fixed waveguide during a playback operation;

(d) said second circulator being arranged to receive the first microwave signal from said rotating waveguide and to cause the latter signal to be applied to said record head for the recording operation, and further being arranged to receive the second microwave signal from said playback head and to apply the latter signal to said rotating waveguide for a playback operation, whereby the certification of the operation of said rotary scanner apparatus is achieved during a recording operation by recording information while contemporaneously reading information.

5. Rotary scanner apparatus as claimed in claim 4 wherein said first signal circulator has a first input arranged to receive the first microwave signal and to direct such signal to said fixed waveguide, and a second input arranged to receive the second microwave signal from said fixed waveguide and to direct such second signal to effect a playback operation contemporaneously with a recording operation.

6. Rotary scanner apparatus as claimed in claim 4 wherein said second circulator has an output, coupled to said record head, to effect a recording operation, and an input, coupled to said playback head, to receive the second microwave signal and to direct such second signal to said rotating waveguide to effect a playback operation contemporaneously with a recording operation.

7. Rotary scanner apparatus as defined in claim 4 wherein said fixed waveguide includes an exciter arranged for circularly polarizing the first microwave signal, and said rotary waveguide includes a circularly polarized exciter to receive the first microwave signal.

* * * * *